Patented June 19, 1951

2,557,655

UNITED STATES PATENT OFFICE 2,557,655

ESTRONE-CYCLO-ETHANOLAMINE

Halfdan Hebo, New York, N. Y.

No Drawing. Application August 28, 1948,
Serial No. 46,710

1 Claim. (Cl. 260—239.5)

This invention relates to new derivatives of the female sex hormone: estrone.

These new estrone compounds consist of the estrone molecule to which has been added ethanolamine ($H_2NCH_2CH_2OH$) at various positions of the estrone molecule.

The ethanolamine compound may under certain conditions form a cyclic addition to the ketone position or 17th position of the estrone molecule. These new estrone derivatives have proved to be extraordinarily active when administrated orally. Biological experiments, using standard rats indicate that the response to these compounds is about ten times that of estrone, when both are administrated orally. Thus, when five micrograms of the ethanolamine compound was administrated to rats orally the response was greater than when 50 micrograms of estrone was given to other rats under similar condition when tested by the modified method of Khant and Doisy (Endocrinology, vol. 12, page 760; 1928).

The derivatives of estrone may be made the following way:

One gram of estrone, either pure or crude, is dissolved in about ten grams of ethanolamine. Hereby a new compound is formed, consisting of the estrone molecule with a molecule of ethanolamine attached at the phenolic position of the estrone. This compound is readily soluble in water.

By heating of the estrone-ethanolamine compound, made as described above, to about 80 degrees centigrade, another compound is formed; the ethanolamine group is being transferred to the ketonic position of the estrone molecule (the 17th position).

By continuous heating at about 80 degrees centigrade, the added ethanolamine group at the ketonic position will cyclise under the separation of one water molecule and form the following compound:

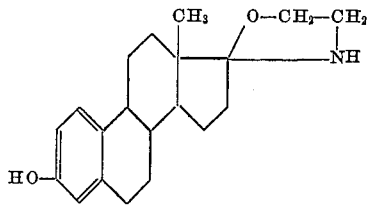

This compound crystallizes out after a few minutes of heating and after about 20-50 minutes the process is about 90 percent completed, depending upon the purity of the original estrone. The new derivative crystallizes out in small, uniform, bacillus-shaped crystals, plainly visible to the naked eye.

The crystals are removed from the mother liquor by vacuum filtration and are washed free from the mother liquor by cold methanol or water or other ethanolamine-miscible solvent, which does not dissolve the newly formed compound.

The non-reacted estrone in the mother liquor may be recovered by addition of a concentrated solution of sodium bicarbonate, which precipitates the non-reacted estrone from the ethanolamine.

The estrone-cyclo-ethanolamine is almost insoluble in ether and isopropyl ether, slightly soluble in water and methanol. It may be recrystallized by dissolving it in about 200 parts of hot methanol and after chilling to about 4 degrees centigrade and addition of one volume of water, estrone-cyclo-ethanolamine will slowly begin to crystallize out in uniform, bacillus-shaped crystals. The crystals have a melting point of 251-253° centigrade.

I claim:

The compound having the structural formula:

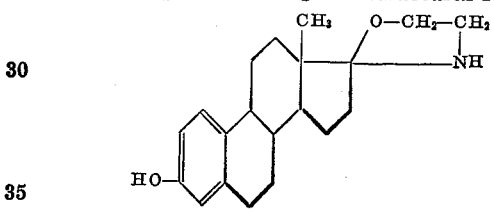

HALFDAN HEBO.

REFERENCES CITED

The following references are of record in the file of this patent:

UNITED STATES PATENTS

| Number | Name | Date |
|---|---|---|
| 2,047,307 | Butenandt | July 14, 1936 |
| 2,055,083 | Klein et al. | Sept. 22, 1936 |
| 2,219,791 | Robald et al. | Oct. 29, 1940 |

FOREIGN PATENTS

| Number | Country | Date |
|---|---|---|
| 676,115 | Germany | May 26, 1939 |